United States Patent [19]

Teti

[11] 4,090,627
[45] May 23, 1978

[54] SCOOP CAR

[75] Inventor: John J. Teti, Saltville, Va.

[73] Assignee: Pyott-Boone Machinery Corporation, Saltville, Va.

[21] Appl. No.: 679,721

[22] Filed: Apr. 23, 1976

[51] Int. Cl.² ............................................. B60P 1/18
[52] U.S. Cl. .................................. 214/506; 214/510; 214/82; 280/474; 280/414.5
[58] Field of Search .................................. 214/78–80, 214/506, 501, 510, 82; 280/DIG. 9, DIG. 14, 474, 478 R, 478 A, 478 B, 414.5

[56] References Cited

U.S. PATENT DOCUMENTS

| | | | |
|---|---|---|---|
| 2,407,007 | 9/1946 | Henrichsen | 280/DIG. 9 |
| 2,795,872 | 6/1957 | Wardle | 214/510 X |
| 3,012,682 | 12/1961 | Williamson | 214/82 |
| 3,033,593 | 5/1962 | Zaha | 280/474 X |
| 3,069,031 | 12/1962 | O'Leary | 214/510 X |
| 3,185,330 | 5/1965 | Buckner | 214/506 |
| 3,271,042 | 9/1966 | Flodin | 214/506 X |
| 3,368,292 | 2/1968 | Prinoth | 280/DIG. 9 |
| 3,717,215 | 2/1973 | Nigg et al. | 280/474 |
| 3,801,137 | 4/1974 | Zucca | 280/474 X |
| 3,937,345 | 2/1976 | Countryman | 214/82 X |

*Primary Examiner*—Albert J. Makay
*Attorney, Agent, or Firm*—Robert D. Yeager; Howard G. Massung

[57] ABSTRACT

A scoop car particularly adaptable for handling a mineral, such as coal, after it has been loosened and piled in a mine wherein the scoop car is provided with movable support wheels. The disclosed scoop car is moved by a traction or towing vehicle. The scoop car is connected to the traction vehicle by a pin or pivot connection to provide good maneuverability when moving to the unloading area. During loading of the vehicle, however, when the scoop car is pushed into the pile of material to be transported it is necessary to prevent movement around the pivot connection so that jack-knifing does not occur. Restricted movement around the pivot is accomplished by a bolster mechanism which contacts both the traction vehicle and the scoop car keeping their longitudinal axis aligned. The bolster mechanism also forces the rear of the scoop car downward so that the scoop car is not pushed upward during loading. That is, the bolster provides downward pressure so the open end of the scoop car does not ride up during loading.

17 Claims, 14 Drawing Figures

SCOOP CAR

BACKGROUND OF THE INVENTION

1. Field of the Invention

This invention relates to mine vehicles and more particularly to a mine car utilized for the loading, transporting and unloading of mine materials.

2. Description of the Prior Art

Vehicles for use in mine shafts are characteristically constructed with a low profile to operate in the constraints of the mine shaft. The most commonly used vehicles are self propelled rubber tired vehicles having an integral scoop attached thereto. Typically mine vehicles which function to load, transport and unload mine materials are constructed as traction vehicles having the scoop supported at one end of the vehicle. The integral scoop is usually supported from the vehicle frame and is raised or lowered as required during operation. While the scoop can be raised or lowered as desired its longitudinal axis cannot be moved from side to side.

During a typical operation the vehicle is driven into the mine shaft to a point where a particular material is piled. The scoop is then lowered to ground level by hydraulic arms and the traction vehicle then forces the scoop forward to collect the material. When the scoop is loaded it is raised to a higher position and the mine vehicle is driven from the mine to unload the material. U.S. Pat. Nos. 3,226,857, 3,545,634 and 3,777,915 represent self powered mine vehicles which are exemplary of this type construction.

Many problems are associated with mine vehicles of the type described above due to the restricted space and heavy loads encountered in the scoop. Since the scoop is supported from the mine car it functions as a lever to transmit motions imparted to the mine vehicle, for example, due to rough road surfaces. With the scoops rigidly attached to the frame, as the mine vehicle travels through the shaft, turbulence of the load is caused which either results in the loss of the mined material, within the shaft, or necessitates slower operation of the vehicle.

Also since the mine cars are of a low profile the raising and lowering of the scoop must be accomplished by apparatus which does not extend in height much above the scoop, which requires relatively heavy structural members. The self propelled vehicle must also be constructed with a suffficient counter weight to offset the load carried in the vehicle. As the load becomes greater the effect of the counter weight is decreased, increasing likely movement of the scoop during operation.

SUMMARY OF THE INVENTION

A scoop car having positionable wheels is provided for use with a traction vehicle in loading, transporting, and unloading mined material. The wheels are positionable to a lower position, supporting the mine car, for transporting the mine material. The mine car is connected to the traction vehicle by a pivotal joint or connection and this provides for good maneuverability when the scoop car is being towed. The scoop car wheels are also positionable at a raised position not supporting the mine car. With the wheels raised the open end of the scoop car rests on the ground while the closed end is supported through the pivotal connection to the traction vehicle. The position is utilized during a loading operation. The scoop car is self loading through a force supplied from the traction vehicle. The car loads itself when pushed into a pile of the material to be moved by the traction vehicle. During loading wheels are raised to present the cutting edge at the open end of the scoop car near grade level. For the car to be pushed into the mine pile, a relatively large force is necessary. To maintain alignment and prevent jackknifing the scoop car's longitudinal axis must be maintained fixed with respect to the traction vehicle. During loading the traction vehicle and the scoop car are normally held aligned along a common longitudinal axis. This alignment is accomplished by a bolster which can be hydraulically operated. In one embodiment the bolster is hinged to the traction vehicle and during loading is forced against the connected end of the scoop car. The bolster also imparts a downward force through the scoop car to the cutting edge of the scoop car bed, to prevent the cutting edge from riding up during loading.

In one embodiment of the invention a self-propelled vehicle for loading material is provided which with includes a traction vehicle having a scoop car pivotally connected thereto. The scoop car has a bed, an open end, a closed end and vertical side wall portions. Wheels are disposed at the side of the scoop car intermediate the open end and the closed end. The wheels which can be rubber are positionable with respect to the scoop car. The scoop car is connected to a tractor through a pivotal connection which permits relative movement of the scoop car and the towing tractor. Bolster means is provided having a first position, not affecting relative movement of the scoop car and the tractor, and a second position, engaging both the scoop car and tractor preventing relative movement of the scoop car with respect to the tractor.

In another embodiment of the invention a scoop car for transporting material is provided having a main body portion formed into a scoop for retaining mined material, such as coal, to be transported. An unloading blade is provided in the bed of the scoop, movable between a loaded position held in proximity to the closed end of the scoop and an unloaded position, forced in proximity to the open end of the scoop. A pair of wheels are connected to the main body portion and are movable between a first position, supporting the scoop car, and a retracted position, not supporting the scoop car. The wheels are supported from fork members rigidly attached perpendicular to the ends of the main axle. The wheels are rotatably disposed around a shaft between the free ends of the fork tines. The main support axle is restrained against rotary motion by a connection to its main longitudinal midpoint. Thus when the axle is rotated to a position where the wheels are down, supporting the scoop car, the axle becomes a torsion bar to act as a spring and absorb road shock. This feature is important in reducing the amount of bounce and thus coal spillage.

The reduction in road shock also allows faster operation of the self propelled mine vehicle and the pivotally connected scoop car.

When the bed of the car is loaded, the scoop car is pulled away from the pile a sufficient distance to provide clearance for lowering the wheels. The bolster is retracted and the scoop car can then be raised and move around its pivotal connection to the tractor. When the bolster is retracted an hydraulic cylinder, forces a square tube, called the wheel positioning tube, toward the rear of the scoop car and this tube controls wheel positioning. The square, which is called the wheel positioning tube, is slotted over the axle to receive one end of a lever arm which is securely fastened at the other end to the axle. When the lever arm turns the axle it forces the wheel forks, which also are rigidly connected to the axle, down. The wheels are then forced to a lowered position engaging the ground and raising the scoop car body.

Since the support axle is restrained only at its center point and the wheel forks are keyed thereto the axle becomes a torsion bar and acts as a spring to absorb road shocks. This is important for reducing the amount of bounce and resulting coal spillage. The scoop car is discharged by a blade connected to a telescoping hydraulic cylinder. A housing is formed around the wheel positioning tube which has a flanged cover formed therearound. This housing cover provides a guide for the blade to maintain a 90° alignment to the housing during blade travel. Shoes attached to the blade follow the housing contour to guide the blade. The flange cover forms a track for shoes attached to the blade to prevent the blade from riding up on the material being unloaded.

It is an object of this invention to teach a wheeled scoop car having means for positioning the wheels to raise and lower the scoop car body.

It is also an object of this invention to teach a wheeled scoop car having a pivotal connection to a traction vehicle.

It is a still further object of this invention to teach a material loading and transporting vehicle having means for maintaining a scoop car axis in alignment with the axis of a traction vehicle during loading.

BRIEF DESCRIPTION OF THE DRAWINGS

For a better understanding of the invention, reference may be had to the preferred embodiment exemplary of the invention shown in the accompanying drawings, in which.

DESCRIPTION OF THE PREFERRED EMBODIMENTS

Figure 1:
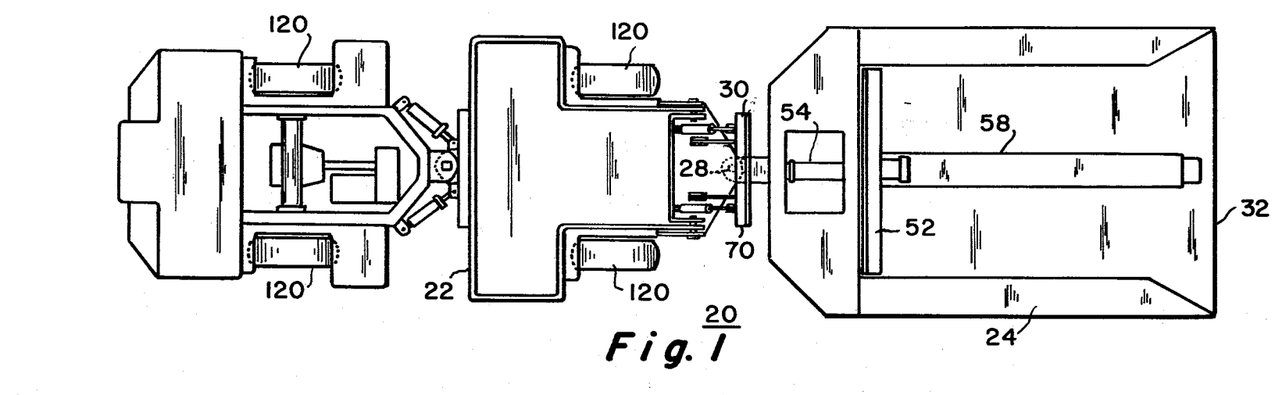
FIG. 1 is a top view of a mine scoop car and traction vehicle utilizing the teaching of the present invention.
Figures 2, 3:
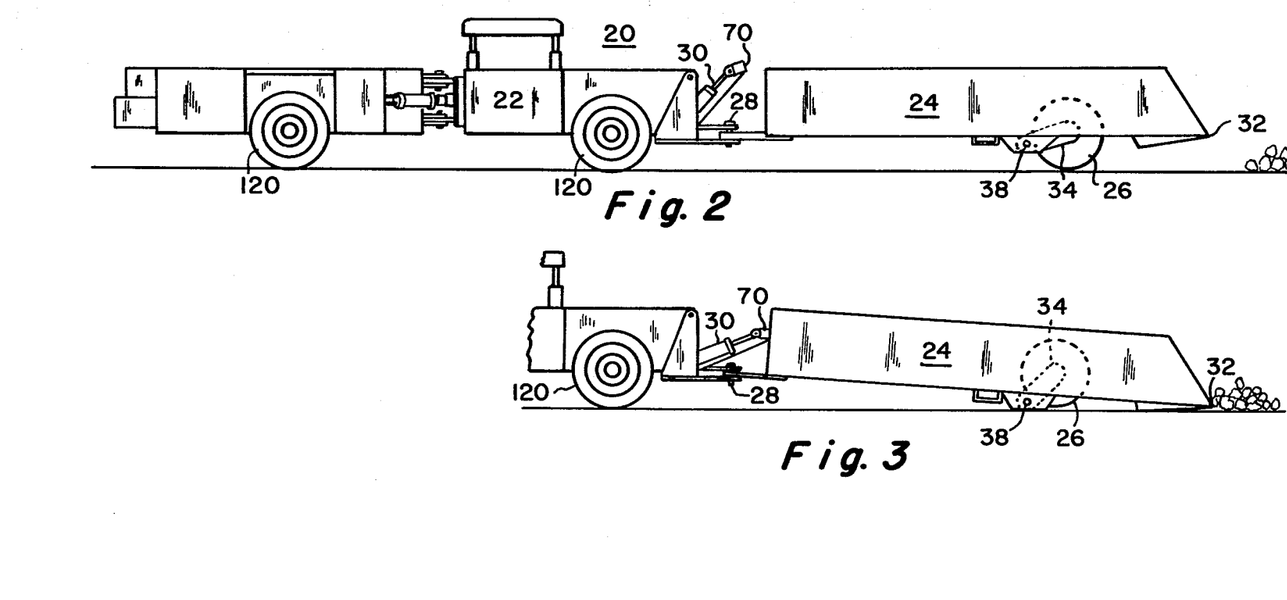
FIG. 2 is a side view of the mine scoop car and traction vehicle shown in FIG. 1.
FIG. 3 is a side view of a portion of the traction vehicle and scoop car shown in FIG. 3 with the scoop car wheels raised.
Figure 4:
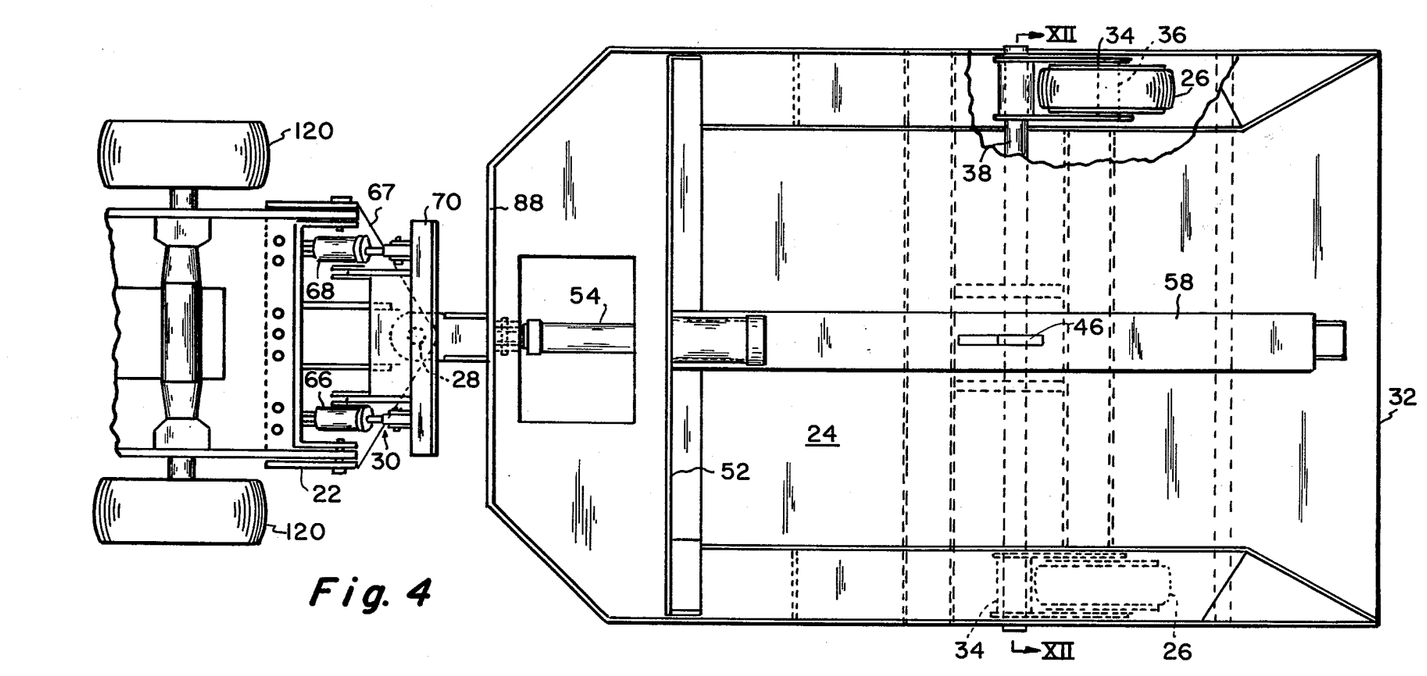
FIG. 4 is an enlarged top view of the scoop car with portions broken away for clarity.
Figure 5:
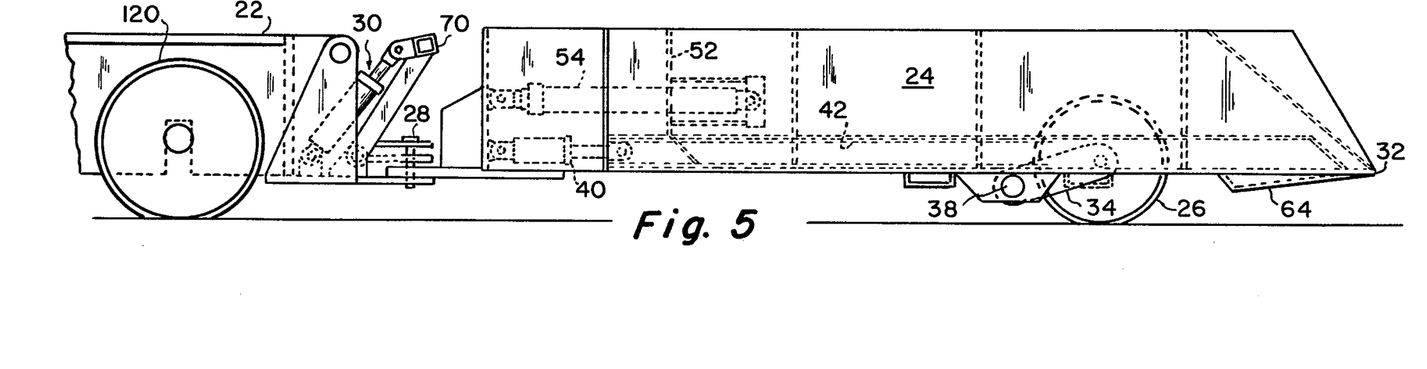
FIG. 5 is a side view of the scoop car.
Figure 6:
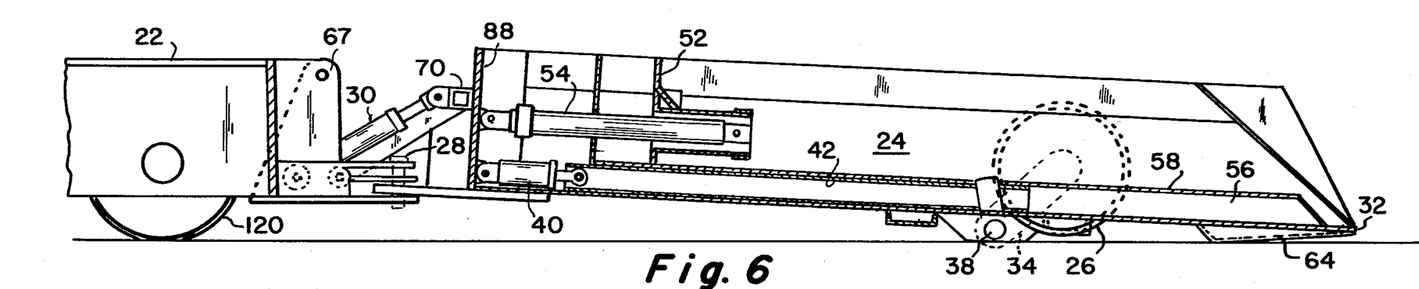
FIG. 6 is a side view of the scoop car with portions not shown for clarity partially in section.
Figure 7:
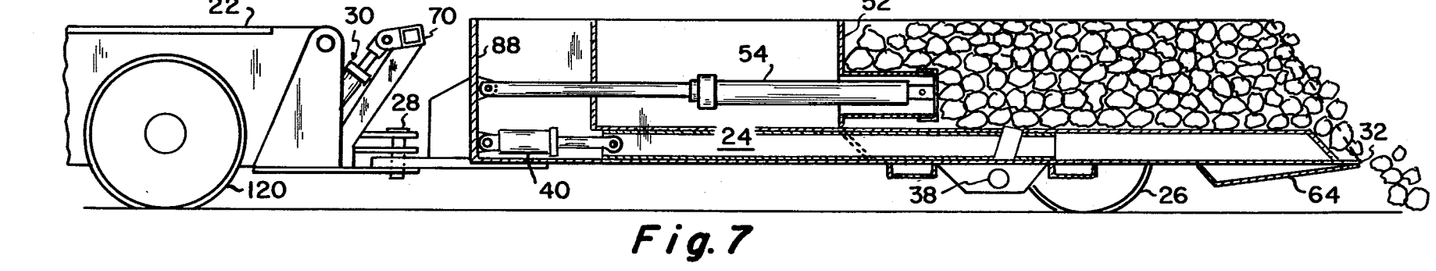
FIG. 7 is a side view of the scoop car with the unloading blade partially extended.
Figure 8:
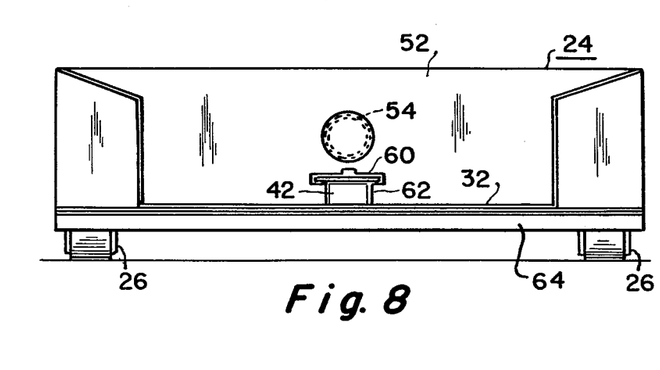
FIG. 8 is an end view of the scoop car looking in the open end.

Referring now to the drawings and FIGS. 1 through 3 in particular there is shown a traction vehicle and mine car utilizing the teachings of the present invention. The entire mine vehicle 20 includes a traction unit 22 and a scoop car 24. Traction vehicle 22 is a self-propelled rubber tired vehicle. An operator drives this vehicle 20. Drive wheels 120, which are normally independently driven, contact the ground and drive traction vehicle 22 which moves scoop car 24. This traction vehicle 22 and scoop car 24 combination is particularly useful in coal mining. This type of vehicle 20 would be useful by the small mine operator, who for example is presently mining around 400 tons per shift with a self powered scoop type machine or other common loading machines. A self powered machine with an integral scoop is not an efficient way of handling coal. In the loaded tram phase of operation the overhung bucket bounces the coal out of the bucket, resulting in a serious road way clean up problem. The traction vehicle 22 and scoop car 24 combination allows approximately twice the amount of coal to be transported per trip as compared to the integral self powered scoop machine. Further due to increased maneuverability and shock absorbing the combination scoop car 24 and traction vehicle 22 can make faster trips.

Scoop car 24 includes wheels 26 which are movable between a raised position, shown in FIG. 3, and lowered position, as shown in FIG. 2. Scoop car 24 with the wheels, lowered as shown in FIG. 2, is connected by a coupling pin 28 to traction vehicle 22. Scoop car 24 when being towed by traction vehicle 22 can move about coupling pin 28 which aids in maneuverability. With the pin type coupling, scoop car 24 trams and tracks like a car. Scoop car 24 is self-loading by being forced into a pile of material such as coal. To load scoop car 24 wheels 26 are raised and the open end of scoop car 24 rests on the ground. A bolster assembly 30 attached to traction vehicle 22 is activated to engage scoop car 24. When bolster 30 engages scoop car 24 it maintains scoop car 24 rigid with respect to traction vehicle 22. The longitudinal axis of scoop car 24 and traction vehicle 22 are maintained in alignment. Bolster 30 prevents scoop car 24 from jackknifing when forced into a coal pile. Bolster 30 when engaging scoop car 24 also puts downward pressure on the cutting edge 32 of scoop car 24. This prevents the cutting edge 32 from riding up when scoop car 24 is forced into a coal pile. When scoop car 24 is loaded it is pulled away from the coal pile and wheels 26 are lowered raising the body of scoop car 24.

Referring now to FIGS. 4 through 7 there is shown a more detailed view of scoop car 24. Rubber tires 26 when lowered support scoop car 24. The rubber tires 26 are supported between the prongs of a forked member 34. Tires 26 are rotated about axle 36 connected between prongs of support member 34. Forked support member 34 is rigidly keyed to an axle 38. When axle 38 is rotated, forked support members 34 also rotate raising or lowering tires 26.

Figures 10, 11, 12:
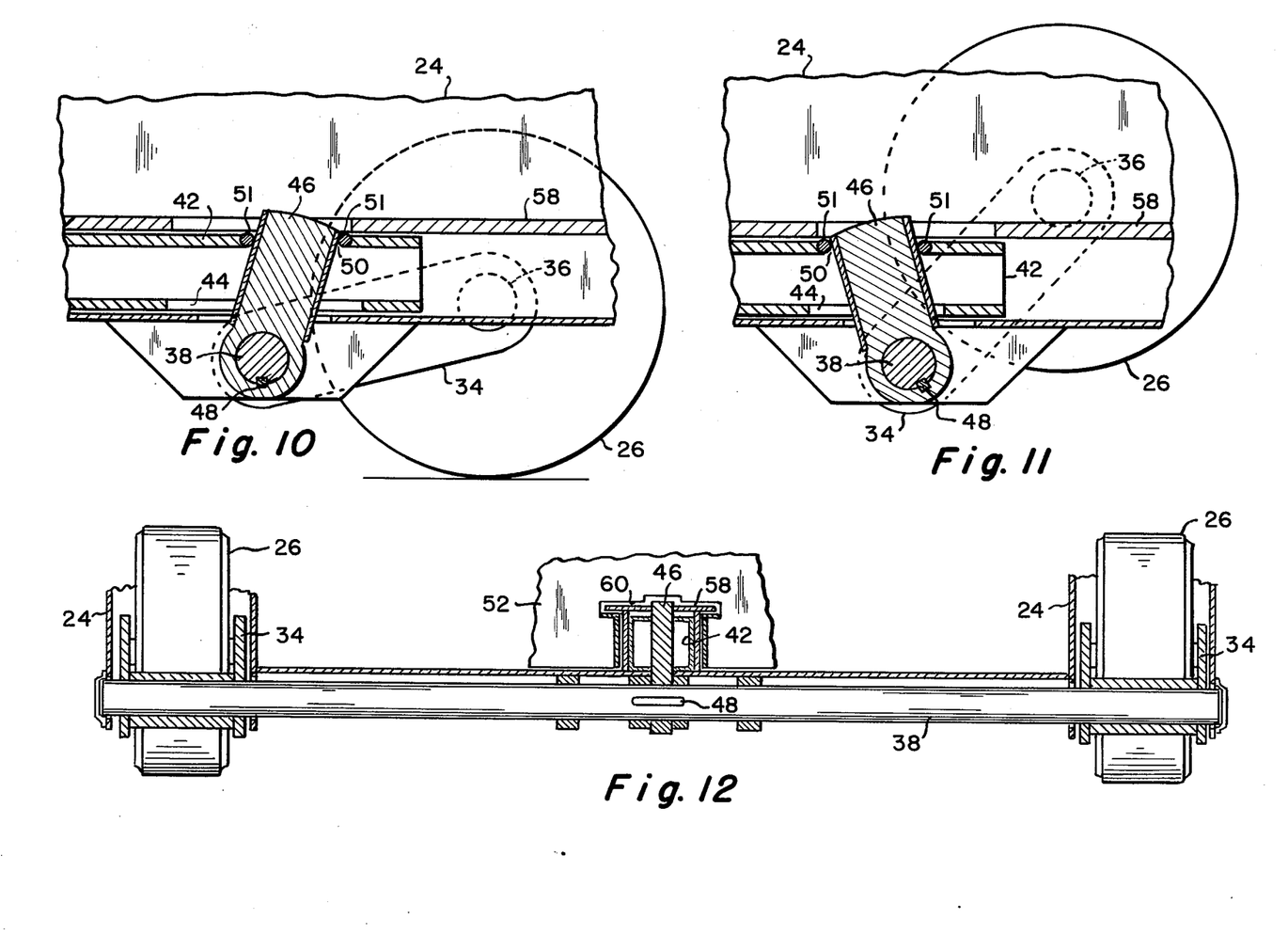
FIG. 10 is an enlarged view partially in section of the axle positioning lever in engagement with the wheel positioning tube keeping the wheels lowered.
FIG. 11 is similar to FIG. 10 but with the wheels in the raised position.
FIG. 12 is a section view taken in FIG. 4 along the lines XII—XII.

Axle 38 is rotated by hydraulic cylinder 40. Hydraulic cylinder 40 connects to a square tubular member 42, called the wheel positioning tube 42, which has a slotted opening 44 formed therein. As can best be seen in FIGS. 10 and 11 a lever arm 46 is rigidly secured to axle 38 by a key 48. Thus when lever arm 46 is rotated axle 38 is also rotated. Lever arm 46 extends through slotted opening 44 into a securing opening 50 formed in the top of square tube 42. Securing opening 50 provides a snug fit for lever arm 46. Wear members 51 are provided at the openings 50 to facilitate sliding movement of lever 46 as wheels 26 are raised or lowered. As shown in FIG. 10 when square tubular member 42 is forced rearward lever 46 is rotated forcing tires 36 into engagement with the ground to raise and support scoop car 24. Square tubular member 42 is forced rearward by hydraulic cylinder 40 extending. When it is desired to lower scoop car 24 hydraulic cylinder 40 is retracted moving the wheel positioning tube 42 towards the closed end of the scoop car 24. This movement rotates forked member 34 in a counter clockwise direction as viewed in FIGS. 10 and 11, raising wheels 26 and letting the open end of scoop car 24 settle to the ground. Wheels 26 can thus be raised or lowered by operation of hydraulic cylinder 40.

As can best be seen in FIG. 12 axle 38 is restrained from rotational movement only at its midpoint by lever 46. Since axal 38 is restrained only at its longitudinal midpoint and supports wheels 36 through forked wheel supports 34, axle 38 acts as a torsion bar support. Under load axle 38 functions as a torsion bar spring, flexing to reduce and absorb road shocks. This is an important feature in reducing the amount of bounce and resulting coal spillage. Coal spillage in the mines presents a serious clean-up and safety problem. The torsion spring effect of axle 38 helps reduce this spillage problem.

Scoop car 24 includes a blade 52 which is movable to unload material from scoop car 24. Blade 52 is moved by a telescopic hydraulic cylinder 54 which is disposed between blade 52 and the closed end of scoop car 24. When it is desired to unload scoop car 24 hydraulic cylinder 54 is activated and scoop 52 pushes any material contained in the bed of scoop car 24 out of the open end.

Figure 9:
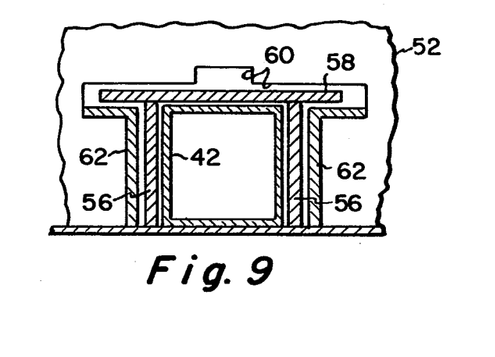
FIG. 9 is an enlarged view of a section through the wheel positioning tube housing.

A housing 56 is formed around the square wheel positioning tube 42. The top of housing 56 is formed from a flange member 58, best seen in FIG. 9. Blade 52 includes a cut out 60 which is disposed around flanged housing 56. The top flange member 58 prevents blade 52 from raising up when material is being unloaded from scoop car 24. Wear shoes 62 are provided on blade 52 to guide blade 52 along housing 56. This maintains blade 52 perpendicular to the longitudinal axle of scoop car 24 and prevents blade 52 from becoming cocked and engaging the side of scoop car 24. Flanged cover 58 also forms a track for wear shoe 62 attached to blade 52 to prevent blade 52 from riding up on the material being unloaded. Telescopic cylinder 54 when extended has sufficient length to move blade 52 in proximity to the open end of scoop car 24.

A wear plate 64 is formed across the bottom of scoop car 24. Thus when wheels 26 are retracted scoop car 24 rests on the wear plate. With the open end of scoop car 24 supported by wear plate 64 and the closed end of scoop car 24 supported by the connection to traction vehicle 22 the cutting edge 32 is maintained slightly above ground level. Maintaining cutting edge 32 slightly above ground level prevents the scoop car from digging into the ground during loading. The bolster prevents cutting edge 32 from raising during loading. Thus during a loading operation the height of cutting edge 32 is maintained relatively constant.

Figure 13:
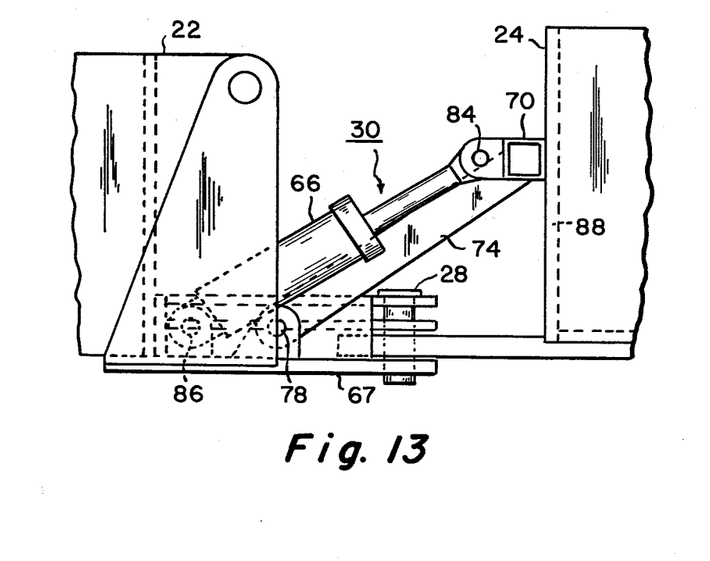
FIG. 13 is an enlarged view of the bolster in the extended position.
Figure 14:
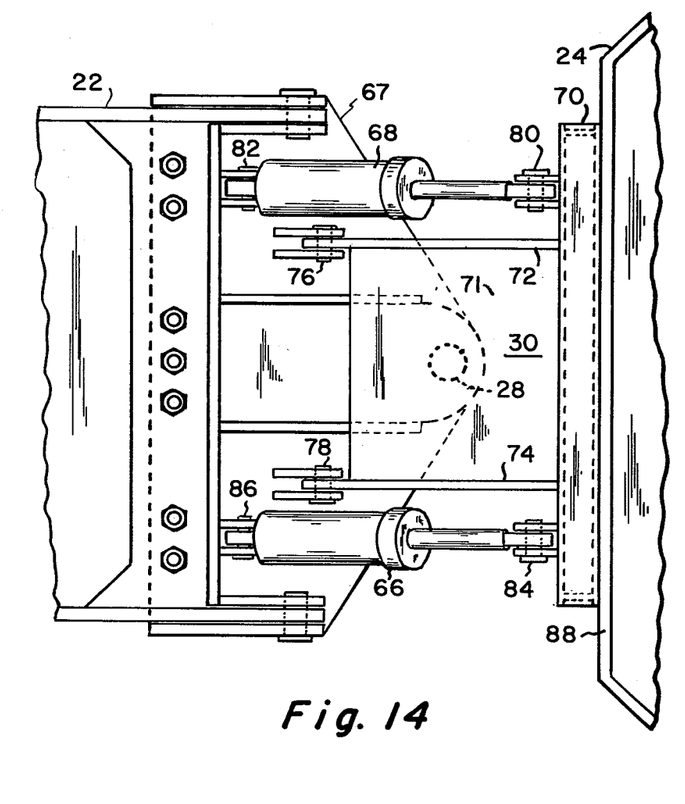
FIG. 14 is a top view of the bolster.

Bolster 30 is provided for restricting movement of scoop car during loading. The construction of bolster 30 can best be seen in FIGS. 13 and 14. Bolster 30 is formed from a pair of hydraulic cylinders 66 and 68 and a beam 70. Beam 70 has a pair of arms 72 and 74 depending therefrom. Arms 72 and 74 are rigidly connected to beam 70 by welding. A plate 71 is welded between arms 72 and 74 to insure rigidity. The free ends of arms 72 and 74 are pivotally connected to traction vehicle 22 by pins 76 and 78. This restricts movement of beams 70 to an arcuate path about an axis through pins 76 and 78. Hydraulic cylinders 66 and 68 are pivotally connected at one end to adapter 67 and pivotally connected at the other end to beam 70. Cylinder 68 is connected by pivot pins 80 to beam 70 and by pivot pin 82 to adapter assembly 67. Hydraulic cylinder 66 is connected by pivot pin 84 to beam 70 and by pivot pin 86 to adapter assembly 67. Adapter assembly 67 is rigidly secured to traction vehicle 22. Traction vehicle 22 can be used with scoop car 24 through adapter assembly 67. Traction vehicle 22 can be converted to use with an integral scoop by removing adapter assembly 67 and making the proper connections to the scoop. When hydraulic cylinders 66 and 68 are activated, beam 70 moves in an arcuate path into engagement with the rear wall 88 of the closed end of scoop car 24. When bolster 30 is activated and beam 70 provides pressure to rear wall 88 relative movement between traction vehicle 22 and scoop car 24 is prevented. When the wheels are raised and the scoop car is pushed into a coal pile, bolsters 30 prevent jackknifing. Hydraulically operated bolster 30 imparts a downward force on cutting edge 32 of car 24 to aid in loading.

After the bed of scoop car 24 is full the scoop car 24 is pulled away from the pile a sufficient distance to provide proper clearance. The wheels are then lowered and car 24 is towed to an unloading area.

Scoop car 24 with its retractable wheels, loads like a scoop and trams and tracks like a car. Scoop car 24 has substantially more capacity than an equivalent integral scoop machine. The adapter assembly 67 permits the scoop to be removed from an existing machine to convert the machine to be used as the traction vehicle 22 with the disclosed scoop car 24. If, for example, the tractor 22 and scoop car 24 are required for full time coal haulage, the connecting end of tractor 22 will be designed for that service and an adapter assembly 67 is not required. If however it is desired to have a machine which sometimes has an integral scoop and at other times uses the scoop car the adapter is required. For certain work such as construction, supply haulage or clean-up, a machine with an integral scoop may be desirable. However, for coal haulage the separate scoop car is desirable for the advantages enumerated above.

Scoop car 24 has a 240 cubic foot capacity and a load capacity of around 12 tons. Scoop car 24 is easily loaded, maneuvered and unloaded. Scoop car 24 has a low profile and does not require being raised above a relatively low height, such as that of the traction vehicle 20 during loading. This feature permits ready use of scoop car 24 in low clearance mines. These advantages provide a scoop car 24 which is well suited for moving mine materials.

Since numerous changes may be made in the above described apparatus additional embodiments of the invention may be made without departing from the spirit and scope thereof, it is intended that all the matter contained in the foregoing description and shown in the accompanying drawings shall be intepreted as illustrative and not in a limited sense.

What is claimed is:

1. A mine vehicle comprising:

a scoop car;
a self-powered tractor having said scoop car pivotally connected thereto for moving said scoop car;
a pair of wheels movable between a lowered position, supporting said scoop car, and a raised position, not supporting said scoop car;
bolster means provided on the mine vehicle having a first position, for engaging said scoop car and said self-propelled tractor to restrict relative movement when said pair of wheels are in a raised position, and a second position not engaging both said scoop car and said self-propelled tractor to permit relative movement when said pair of wheels are in a lowered position;
a cutting edge formed on the open end of said scoop car; and,
a wear plate formed beneath said cutting edge to maintain said cutting edge slightly above ground to facilitate loading without digging in of said cutting edge.

2. Apparatus as claimed in claim 1 wherein:
said bolster means when in the first position engages said scoop car and said self-propelled tractor and maintains them along a common longitudinal axis.

3. Apparatus as claimed in claim 2 wherein:
said bolster means comprises hydraulically operated actuating cylinders.

4. Apparatus as claimed in claim 1 comprising:
an unloading blade hydraulically operated disposed in the bed of said scoop car for relative movement; and,
guide means disposed longitudinal in the bed of said scoop car for maintaining said unloading blade perpendicular to the longitudinal axis of said scoop and for preventing upward movement of said blade.

5. Apparatus as claimed in claim 1 comprising:
a pair of forked members each having one of said pair of wheels disposed between the prongs of the forks;
an axle having one of said pair of forked members rigidly connected at each end thereof, the prongs of said forked member extending perpendicular to the longitudinal axis of the axle; and
restraining means for securing said axle at the longitudinal center against rotary movement.

6. Apparatus as claimed in claim 5 comprising:
rotating means for rotating said axle to raise and lower said pair of wheels.

7. A mine vehicle comprising:
a scoop car;
a self-powered tractor having said scoop car pivotally connected thereto for moving said scoop car;
a pair of wheels movable between a lowered position, supporting said scoop car, and a raised position, not supporting said scoop car;
bolster means provided on the mine vehicle having a first position, engaging said scoop car and said self-propelled tractor for restricting the relative movement, and a second position not engaging both said scoop car and said self-propelled tractor for permitting relative movement;
a pair of forked members each having one of said pair of wheels disposed between the prongs of the forks;
an axle having one of said pair of forked members rigidly connected at each end thereof, the prongs of said forked member extending perpendicular to the longitudinal axis of the axle;
restraining means for securing said axle at the longitudinal center against rotary movement;
a lever arm rigidly secured to said axle and extending from the longitudinal axis of said axle;
a square tubular member having slots formed therein for receiving said lever arm disposed transverse to the longitudinal axis of said axle; and,
hydraulic operating means for positioning said square tubular member to raise and lower said pair of wheels.

8. A mine vehicle comprising:
a scoop car;
a self-powered tractor having said scoop car pivotally connected thereto for moving said scoop car;
a pair of wheels movable between a lowered position, supporting said scoop car, and a raised position, not supporting said scoop car;
bolster means provided on the mine vehicle having a first position, for engaging said scoop car and said self-propelled tractor to restrict relative movement when said pair of wheels are in a raised position, and a second position not engaging both said scoop car and said self-propelled tractor to permit relative movement when said pair of wheels are in a lowered position;
a pivot pin connection for connecting said scoop car to said self-powered tractor;
a cutting edge formed on the open end of said scoop car; and,
a wear plate formed beneath said cutting edge to maintain said cutting edge slightly above ground and to prevent digging in during loading.

9. A scoop car pivotally connected to a tractor for transporting material comprising:
a main body portion formed into a scoop for containing the material to be transported having an open end and a closed end;
an unloading blade movable between a loaded position in proximity to the closed end of said main body portion and an unloaded position in proximity to the open end of said main body portion;
a pair of wheels connected to said main body portion movable between a down position supporting said scoop car and a retracted position not supporting said scoop car;
a cutting edge formed at the opened end of said scoop;
a wear plate formed beneath said cutting edge for partially supporting said main body portion when said pair of wheels are in a retracted position and maintaining said cutting edge at a slightly raised position; and,
bolster means disposed between the scoop car and the tractor for restricting upward movement of said cutting edge when said pair of wheels are in a retracted position.

10. A scoop car as claimed in claim 9 comprising:
an axle disposed beneath said scoop car extending transverse to the longitudinal axis of said scoop car;
a pair of forked ends extending perpendicular from each end of said axle perpendicular to the longitudinal axis of said axle for receiving said pair of wheels; and,
wheel positioning means disposed for moving said axle to raise or lower said pair of wheels.

11. A scoop car for transporting material comprising:

a main body portion formed into a scoop for containing the material to be transported having an open end and a closed end;

an unloading blade movable between a loaded position in proximity to the closed end of said main body portion and an unloaded position in proximity to the open end of said main body portion;

a pair of wheels connected to said main body portion movable between a down position supporting said scoop car and a retracted position not supporting said scoop car;

an axle disposed beneath said scoop car extending transverse to the longitudinal axis of said scoop car;

a pair of forked ends extending perpendicular from each end of said axle perpendicular to the longitudinal axis of said axle for receiving said pair of wheels;

a lever rigidly connected to said axle and extending perpendicular therefrom;

a tube having a slot formed therein for receiving said lever; and, means for moving said tube longitudinally for rotating said axle to raise or lower said pair of wheels.

12. Apparatus as claimed in claim 11 wherein said means for moving said tube comprises:
a first hydraulic cylinder; and including
a second hydraulic cylinder for positioning said unloading blade.

13. Apparatus as claimed in claim 12 comprising:
a hitch formed at the closed end of said scoop car for a pin connection to a traction vehicle permitting relative movement around the connection.

14. A self-propelled vehicle for loading material comprising:
a scoop car having an open end, a closed end and side portions;
wheels disposed on each side of said scoop car, intermediate the open end and the closed end, positionable in a down position to support said scoop car and an up position not supporting said scoop car;
a tractor for moving said scoop car;
a connection between said scoop car and said tractor permitting relative movement of the longitudinal axis of said scoop car and the longitudinal axis of said tractor;
bolster means disposed on said tractor having a first position not engaging said scoop car and not affecting relative movement of said scoop car and said tractor, and a second position for engaging said scoop car when said wheels are in an up position preventing relative movement of the longitudinal axis of said tractor and the longitudinal axis of said scoop car;
a cutting edge formed across the open end of said scoop car; and,
a wear plate formed lower than said cutting edge for partially supporting said scoop car when said wheels are in an up position.

15. A scoop car, having open and closed ends, and a traction vehicle combination used for loading and transporting coal comprising:
wheels positionable at a lowered position to support the scoop car and a raised position not supporting the scoop car;

a pivot connection between the scoop car closed end and the traction vehicle;

restraining means disposed between the scoop car closed end and the traction vehicle for restricting movement around the pivot connection between the scoop car and the traction vehicle when said wheels are in a raised position and the scoop car is being moved into a pile of material to be loaded;

positioning means connected to said wheels for positioning said wheels at a lowered position, supporting said scoop car and a raised position wherein one end of the scoop car rests on the ground;

an unloading blade disposed in the scoop car movable to a first position in proximity to the closed end of the scoop car and a second position in proximity to the open end of the scoop car;

guide means disposed longitudinally in the bottom of the scoop car for guiding and restricting movement of said unloading blade;

a free cutting edge formed on the open end of said scoop car, which is positioned slightly above the ground when said wheels are in the raised position; and, a wear plate formed near but beneath said free cutting edge for supporting said free cutting edge slightly above the ground when said wheels are in the raised position and one end of the scoop car rests on the ground.

16. A self-propelled vehicle for loading material comprising:
a scoop car having an open end, a closed end and side portions;
wheels disposed on each side of the scoop car intermediate the open end and the closed end, positionable in a down position to support said scoop car and an up position not supporting said scoop car;
a tractor for moving said scoop car;
a connection between said scoop car and said tractor permitting relative movement of the longitudinal axis of said scoop car and the longitudinal axis of said tractor;
bolster means having a first position, not affecting relative movement of said scoop car and said tractor, and a second position for preventing relative movement of the longitudinal axis of said tractor and the longitudinal axis of said scoop car when said wheels are in an up position;
a cutting edge formed across the open edge of said scoop car;
a wear plate formed lower than said cutting edge for partially supporting said scoop car when said wheels are in an up position;
said bolster means comprises,
a pair of hydraulic cylinders having one end pivotally connected to said tractor; and,
a beam connecting the movable end of said pair of hydraulic cylinders and being disposed to engage said scoop car when activated to prevent relative movement.

17. A self-propelled mine vehicle as claimed in claim 16 comprising:
a pair of arms rigidly connected at one end and to said beam and pivotally connected at the other end to said tractor.

* * * * *